April 18, 1950
R. H. WOLF
2,504,610
SWING SPOUT FAUCET
Filed Dec. 26, 1945
2 Sheets-Sheet 1
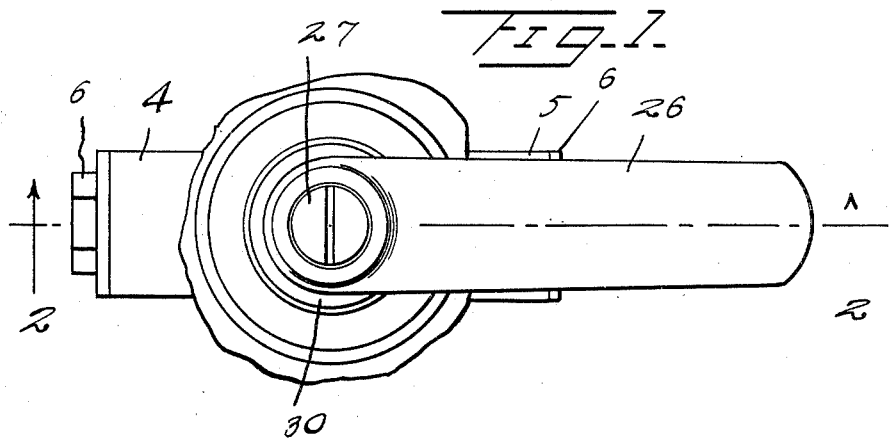
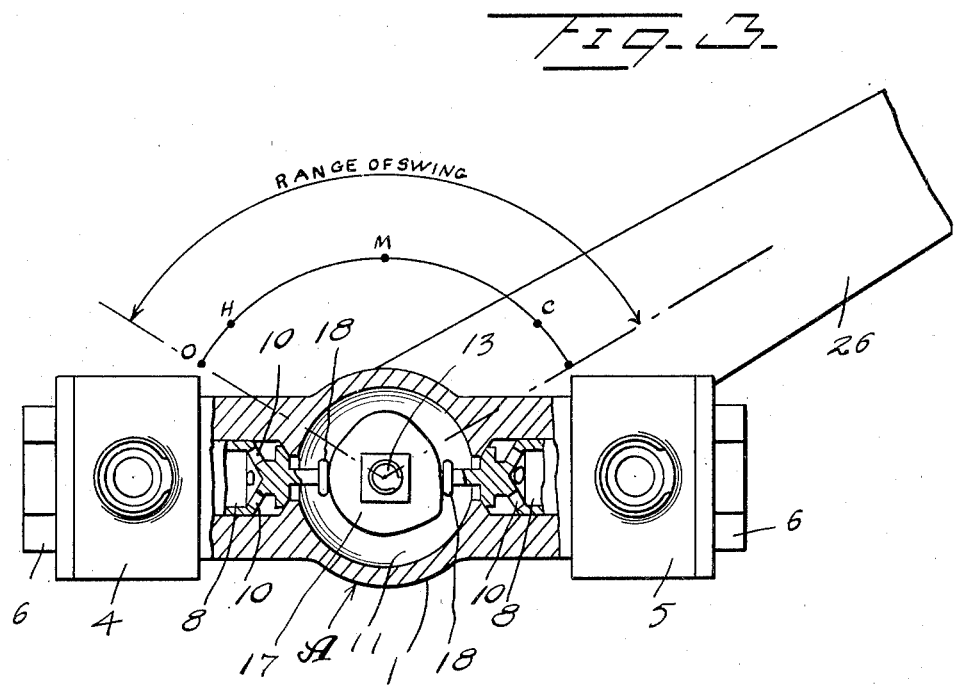

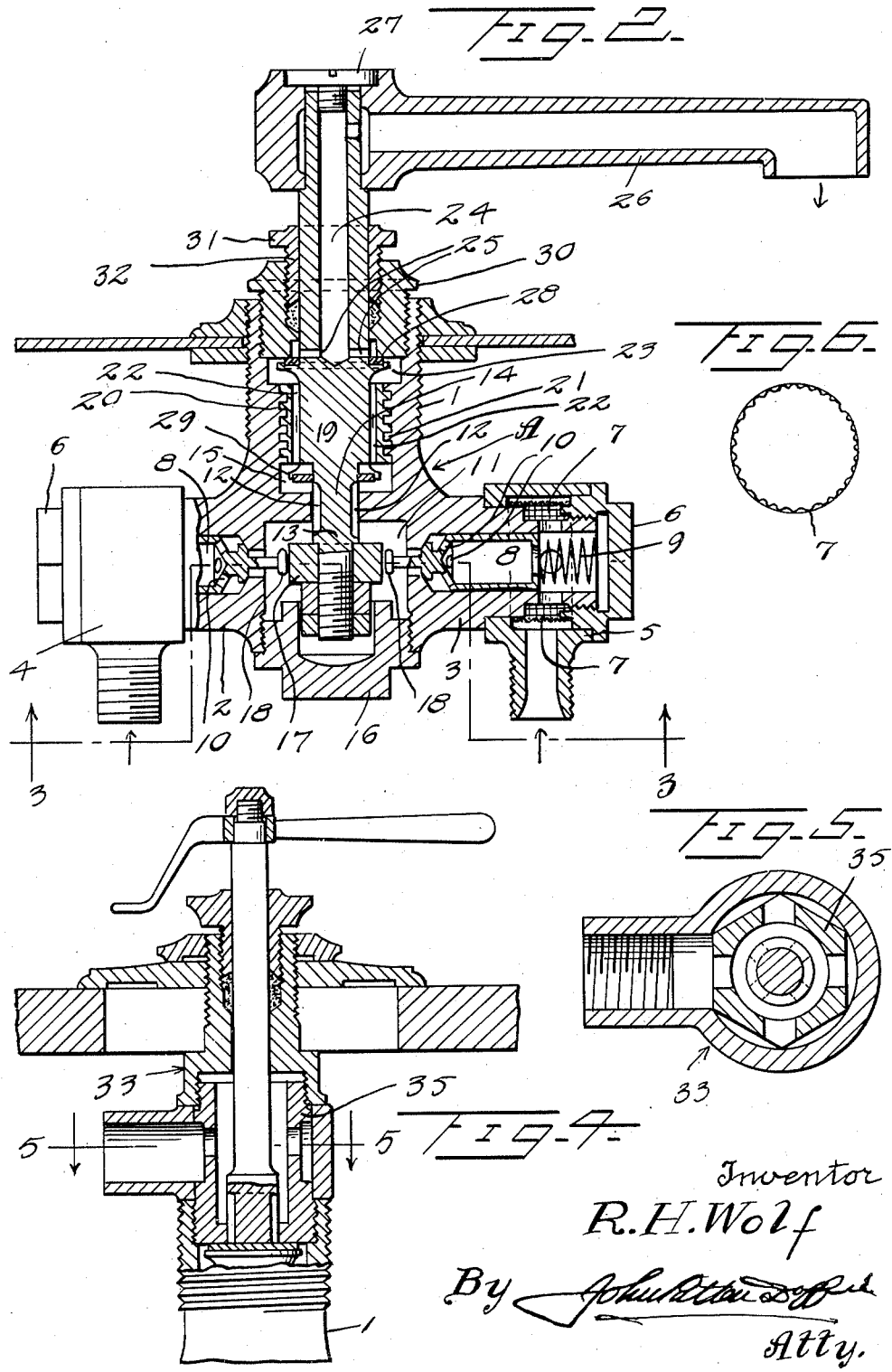

Patented Apr. 18, 1950

2,504,610

UNITED STATES PATENT OFFICE 2,504,610

SWING SPOUT FAUCET

Richard H. Wolf, Gary, Ind.

Application December 26, 1945, Serial No. 637,144

1 Claim. (Cl. 277—18)

This invention relates to new and useful improvements in swing spout faucets.

The primary object of my invention is to provide a novel type of faucet in which the desired temperature of the water may be regulated and obtained merely by swinging the spout in the arc of a circle into the proper position, and without the necessity of turning or adjusting any handles or other like fixtures.

A further object of my invention is to provide a swing spout faucet in which the opening of the hot and cold water valves is controlled by means of a cam mounted on the lower end of the shaft carrying the swinging spout.

A still further object of my invention is to provide a faucet of the character specified that may be readily adapted for use with a shower by employing a special fitting provided with a handle and pipe connection.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a plan view.

Figure 2 is a vertical longitudinal section, taken on line 2—2 of Figure 1.

Figure 3 is a horizontal section, taken on line 3—3 of Figure 2.

Figure 4 is a fragmentary sectional view, illustrating the special fitting or attachment for using the device in connection with a shower.

Figure 5 is a horizontal transverse section, taken on line 5—5 of Figure 4, and Figure 6 is a detail sectional view of one of the strainers used at the inlets for the hot and cold water supply.

Referring to the drawings for a more particular description of my invention, and in which drawings like parts are designated by like reference characters throughout the several views, A designates the main body or casing, of substantially inverted T-shaped form, consisting of the central vertical exteriorly threaded stem or housing 1 and the corresponding oppositely extending end portions 2 and 3, respectively. The end portions 2 and 3 are provided with the nipples 4 and 5, which are connected to the hot and cold water supply and held in place by the nuts 6. Cylindrical strainers 7 are employed in connection with the nipples 4 and 5, and in practice, the water passes through said strainers before passing into the outer ends of the hollow cylindrical metal valves 8, which are normally held in closed position by the water pressure and action of the coil springs 9. The coil springs 9 are arranged in the end portions 2 and 3 of the main body or casing A, with their outer ends bearing against the inner walls of the nuts 6 and their inner ends bearing against the outer ends of the valves 8. The inner ends of the valves 8 are formed directly behind their respective valve seats, with several relatively small ports or openings 10, and when said valves are open, the water passes through these ports or openings into the central circular chamber 11 at the bottom of the main body or casing A and thence through vertical grooves or passage-ways 12 in the lower end 13 of the perpendicular shaft 14 into the lower chamber 15. As shown, the lower end 13 of the shaft 14 extends into and through the central chamber 11 and is housed in the hollow nut 16, screwing into the bottom of the main body A.

In carrying out my invention, a cam 17 is fastened to the lower end 13 of the perpendicular shaft 14 and co-acts with the inwardly projecting nose-portions 18 of the hollow cylindrical valves 8 in opening the latter against the water pressure and action of the coil springs 9, as will more fully hereinafter appear.

The shaft 14 is formed with a central cylindrical body portion 19, which is exteriorly threaded, as at 20, for engagement with a screw thread 21, formed in the inner wall of the stem or housing 1. A series of longitudinal grooves or channels 22 are formed in the outer surface of the body portion 19 of the shaft 14 and the upper ends of these grooves communicate with the upper chamber 23. The upper end of the shaft 14 is in the form of a hollow pipe 24 and is provided at its lower end with a series of transverse ports or openings 25 adapted to communicate with the chamber 23 when the faucet is open. The spout 26 of the faucet is fastened to the upper end of the shaft 14 by the screw 27 or other equivalent means.

The spout 27 is adapted to swing in a horizontal plane in the arc of a circle, in opening or closing the water supply, or in regulating the relative proportion of hot and cold water. When the spout is at the extreme limit of its swing or movement in either direction, as indicated by the letters O, the valves 8 are closed and the water supply completely shut off. When the spout is moved to the point indicated by the letter H of the dial, the hot water valve 8 is opened and only hot water flows through the upper end of the shaft 14 into and through the spout 26. When the spout is in the position indicated by the letter C only cold water flows. When the spout is at any point between the letters H and M the mixture consists of a greater proportion of hot than cold water, and when the spout is in any position between the letters C and M, the reverse is the case, that is to say, there is a greater proportion of cold than hot water.

The perpendicular shaft 14 is provided immediately above and below its screw threaded body portion 19, with the sealing washers 28 and 29, which control the opening and closing of the water passages communicating with the upper and lower chambers 23 and 15, respectively.

A cylindrical nut 30 screws into the upper end of the stem or housing 1 of the main body A and receives the packing gland 31 and sleeve 32, the purpose of which will be apparent.

When it is desired to use the device in connection with a shower where it is not practical to remove the latter, from its fixed position, a special fitting 33 may be employed. This fitting is applied by removing the nut 30 and screwing the fitting into the stem or housing 1 and holding the T-shaped shower pipe connection in place by the sleeve 35. In this instance, the water will flow from the upper chamber 23 to the shower outlet, as indicated by the arrows. Arrows also indicate the course of the water when the device is used as a faucet.

From the foregoing description taken in connection with the drawings, it is thought that the construction, operation and advantages of my invention will be readily understood, without requiring a more extended explanation.

Various changes in the form, proportions and minor details of construction may be resorted to without departing from the principles or sacrificing any of the advantages of my invention, as defined in the appended claim.

Having described my invention, what I claim as new and desire to secure by Letters Patent, is:

In a swing spout faucet, a main body or casing, hollow cylindrical valves mounted in said casing and communicating with the hot and cold water supply said valves formed with inwardly projecting nose-portions, a perpendicular shaft rotatably mounted in and having screw threaded engagement with the main body, a swing spout fastened to the upper end of said shaft and adapted to swing in the arc of a circle and a cam mounted on the lower end of said shaft and engaging the nose-portions of said valves, said cam adapted to partially or completely open said valves when the spout is swung in the desired position, the shape of the cam being such that when the spout is in either of its two extreme positions, the supply of hot and cold water is completely shut off, and when at a point adjacent to either of its two extreme positions, only the hot or cold water supply is open and when in a position between either of said last mentioned points and a central point on the dial, a varying mixture of hot and cold water is obtained, strainers for said hollow cylindrical valves and springs tending to hold said valves in closed position.

RICHARD H. WOLF.

REFERENCES CITED

The following references are of record in the file of this patent:

UNITED STATES PATENTS

| Number | Name | Date |
|---|---|---|
| 262,632 | Whittaker | Aug. 15, 1882 |
| 1,160,484 | Wright | Nov. 16, 1915 |
| 1,688,391 | Magazzini | Apr. 12, 1927 |
| 2,181,630 | Taddeo | Aug. 9, 1938 |